(12) United States Patent
Deng

(10) Patent No.: US 9,088,750 B2
(45) Date of Patent: Jul. 21, 2015

(54) APPARATUS AND METHOD FOR GENERATING PICTURE-IN-PICTURE (PIP) IMAGE

(75) Inventor: Wei Deng, Sunnyvale, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 0 days.

(21) Appl. No.: 13/558,207

(22) Filed: Jul. 25, 2012

(65) Prior Publication Data

US 2014/0028913 A1   Jan. 30, 2014

(51) Int. Cl.
| | | |
|---|---|---|
| H04N 5/445 | (2011.01) | |
| H04N 5/232 | (2006.01) | |
| H04N 5/247 | (2006.01) | |
| H04N 5/262 | (2006.01) | |
| H04N 5/225 | (2006.01) | |
| H04N 5/45  | (2011.01) | |
| H04N 21/431 | (2011.01) | |

(52) U.S. Cl.
CPC ......... *H04N 5/44591* (2013.01); *H04N 5/2258* (2013.01); *H04N 5/23293* (2013.01); *H04N 5/247* (2013.01); *H04N 5/2621* (2013.01); *H04N 5/2624* (2013.01); *H04N 5/45* (2013.01); *H04N 21/4316* (2013.01)

(58) Field of Classification Search
CPC ....................................................... H04N 5/04
USPC .............................................................. 725/38
See application file for complete search history.

(56) References Cited

U.S. PATENT DOCUMENTS

| | | | |
|---|---|---|---|
| 6,166,777 A | | 12/2000 | Ock |
| 2004/0168185 A1* | | 8/2004 | Dawson et al. ................. 725/38 |
| 2007/0200923 A1* | | 8/2007 | Eleftheriadis et al. ..... 348/14.08 |
| 2007/0285514 A1 | | 12/2007 | Perlman et al. |
| 2011/0102671 A1 | | 5/2011 | Tsai |

* cited by examiner

*Primary Examiner* — Jefferey Harold
*Assistant Examiner* — Sihar Karwan
(74) *Attorney, Agent, or Firm* — Lathrop & Gage LLP

(57) ABSTRACT

According to a picture-in-picture (PIP) system and method, a first image sensor device detects light from a first subject and generates a first signal indicative of image data for the first subject. A second image sensor device detects light from a second subject and generates a second signal indicative of image data for the second subject. Overlay logic combines the first and second signals to generate a picture-in-picture signal indicative of a combination of an image of the first subject and an image of the second subject, wherein the overlay logic is located within the first image sensor device. The first image sensor device generates a synchronization signal which is received by the second image sensor device and triggers the second image sensor device to generate the second signal indicative of image data for the second subject.

10 Claims, 4 Drawing Sheets

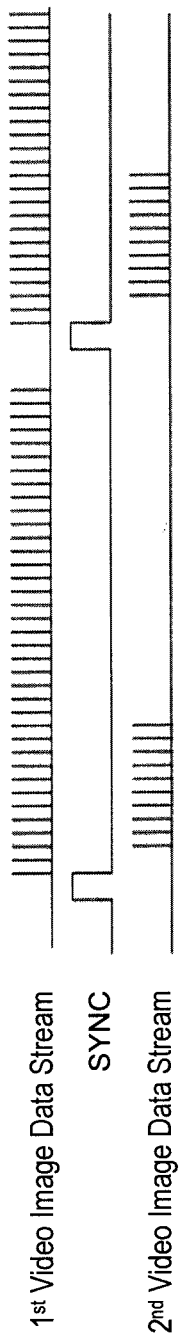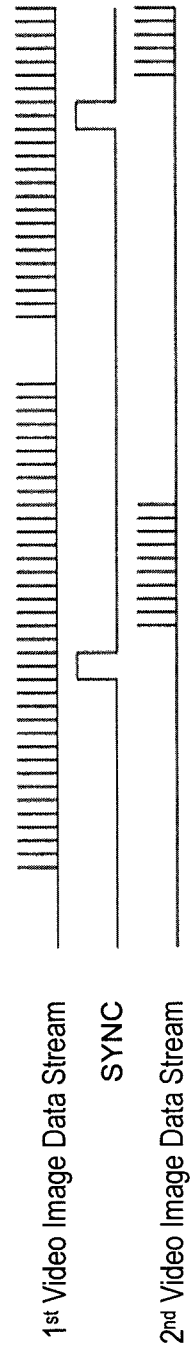

APPARATUS AND METHOD FOR GENERATING PICTURE-IN-PICTURE (PIP) IMAGE

BACKGROUND

1. Technical Field

This disclosure is related to generation of video images and, more particularly, to apparatuses and methods for generating picture-in-picture video images.

2. Discussion of the Related Art

In conventional picture-in-picture (PIP) systems, a first image sensor generates a first image, and a second image sensor generates a smaller and lower-resolution second image. Each of the image sensors provides video image data for its respective image in the form of a video image data stream. Typically, the data of the video image data stream for the second, smaller image are stored in a frame memory. Overlay logic receives the video image data stream from the first image sensor and the video image data stream for the second image from the frame memory and combines the two images to generate a video image data stream for the PIP image output. The PIP video image data stream output from the overlay logic is then used to generate a composite PIP video image.

The frame memory for these conventional systems is necessarily large, because it is required to store large amounts of video data. Since the frame memory takes up a large amount of space on an integrated circuit chip die, it cannot be integrated with the image sensors, and is, therefore, fabricated as a separate individual device element in a conventional PIP system, which occupies a large amount of space. Also, the separate frame memory results in relatively high overall system power consumption due to the large number of required memory access operations.

SUMMARY

According to a first aspect, a picture-in-picture (PIP) system is provided. The system includes a first image sensor device for detecting light from a first subject and generating a first signal indicative of image data for the first subject, and a second image sensor device for detecting light from a second subject and generating a second signal indicative of image data for the second subject. Overlay logic combines the first and second signals to generate a picture-in-picture signal indicative of a combination of an image of the first subject and an image of the second subject. The overlay logic is located within the first image sensor device.

According to another aspect, a picture-in-picture (PIP) system is provided. The system includes a first image sensor device for detecting light from a first subject and generating a first signal indicative of image data for the first subject, the first signal comprising a first video image data stream, the first image sensor device generating a synchronization signal. A second image sensor device detects light from a second subject and generates a second signal indicative of image data for the second subject, the second signal comprising a second video image data stream, the second video image data stream being triggered in response to the synchronization signal. Overlay logic combines the first and second signals to generate a picture-in-picture signal indicative of a combination of an image of the first subject and an image of the second subject.

According to another aspect, a picture-in-picture (PIP) method is provided. According to the method, light from a first subject is detected, and a first signal indicative of image data for the first subject is generated, using a first image sensor device. Light from a second subject is detected, and a second signal indicative of image data for the second subject is generated, using a second image sensor device. The first and second signals are combined to generate a picture-in-picture signal indicative of a combination of an image of the first subject and an image of the second subject. The first and second signals are combined by the first image sensor device.

According to another aspect, a picture-in-picture (PIP) method is provided. According to the method, light from a first subject is detected, and a first signal indicative of image data for the first subject is generated, using a first image sensor device. The first signal comprises a first video image data stream, the first image sensor device generating a synchronization signal. Light from a second subject is detected, and a second signal indicative of image data for the second subject is generated, using a second image sensor device. The second signal comprises a second video image data stream. The second video image data stream is triggered in response to the synchronization signal. The first and second signals are combined to generate a picture-in-picture signal indicative of a combination of an image of the first subject and an image of the second subject.

BRIEF DESCRIPTION OF THE DRAWINGS

The foregoing and other features and advantages will be apparent from the more particular description of preferred embodiments, as illustrated in the accompanying drawings, in which like reference characters refer to the same parts throughout the different views. The drawings are not necessarily to scale. In the drawings, the sizes of features may be exaggerated for clarity.

FIGS. 3A and 3B include schematic timing diagrams illustrating the timing of first and second video image data streams and synchronization signal SYNC, according to some exemplary embodiments.

DETAILED DESCRIPTION

Figure 1:
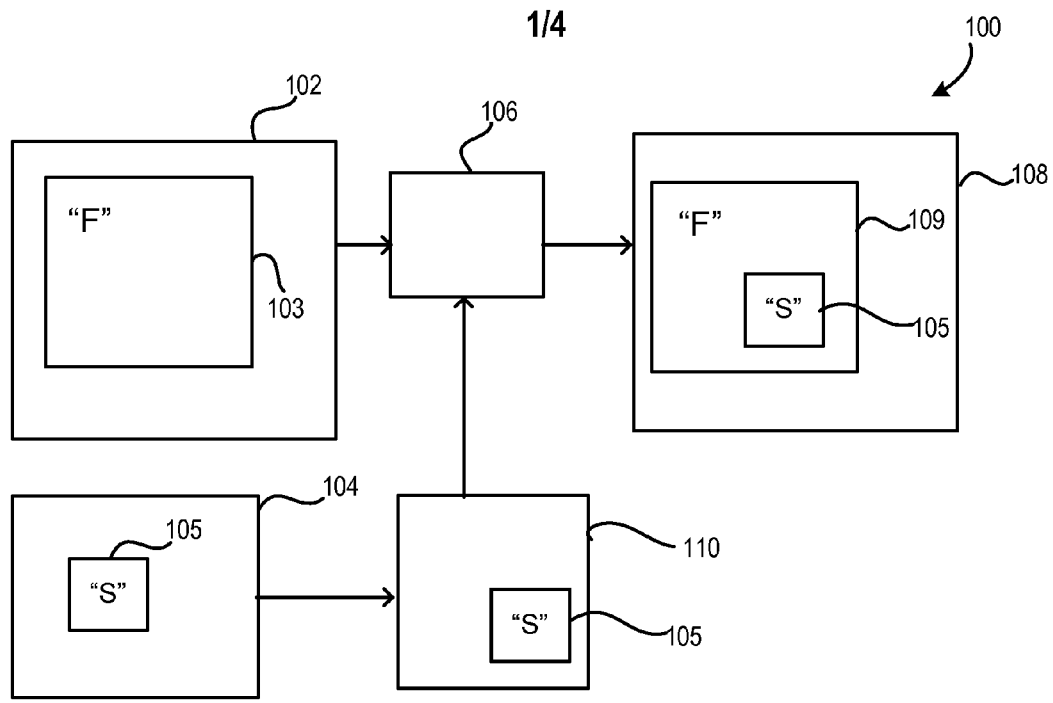
FIG. 1 includes a schematic block diagram of a conventional system and method for forming a picture-in-picture (PIP) image.

FIG. 1 includes a schematic functional block diagram of a conventional system 100 and method for forming a picture-in-picture (PIP) image. Referring to FIG. 1, system 100 includes a first video image sensor 102 for generating a first video image "F" 103 of a first scene. System 100 also includes a second video image sensor 104 for generating a second video image "s" 105 of a second scene. In general, second video image sensor 104 generates a smaller video image "s" 105 having lower resolution, compared to the first video image "F" 103 of first video image sensor 102. In the final composite PIP video image 109, second video image "s" 105 is combined with and located within the first video image "F" 103.

System 100 of FIG. 1 also includes overlay logic 106. Overlay logic 106 contains the processing and logic circuitry used to combine first video image "F" 103 of first video image sensor 102 with second video image "s" 105 of second video image sensor 104 to generate the video image data required for composite PIP video image 109. Overlay logic 106 outputs the PIP video image data stream for composite PIP video image 109 to a device 108 such as a display for display of composite PIP video image 109 and/or a memory for storage of composite PIP video image 109. Composite PIP video image 109 is a combination of first video image "F" 103 and second video image "s" 105.

Referring to FIG. 1, overlay logic 106 receives the video image data stream for first video image "F" 103 directly from first video image sensor 102. However, overlay logic 106 receives the video image data stream for second video image "s" 105 from a frame memory 110. The video image data for second video image "s" 105 is temporarily stored in frame memory 110 by second video image sensor 104. This temporary storage of the video image data is necessary in conventional PIP system 100 because first and second video image sensors 102 and 104 and their respective video image data streams are not synchronized. As a result, the video image data for second video image "s" 105 is temporarily stored in frame memory 110 to ensure that none of the video image data for second video image "s" 105 is lost while overlay logic 106 performs the processing required to combine first and second video images "F" 103 and "s" 105.

Frame memory 110 is typically a very large memory required to store large amounts of video image data. As such, it cannot be integrated with first or second video image sensors 102, 104, and is fabricated as a separate device. It therefore results in a substantial size increase in system 100. Separate frame memory 110 can also consume a relatively large amount of power.

Figure 2:
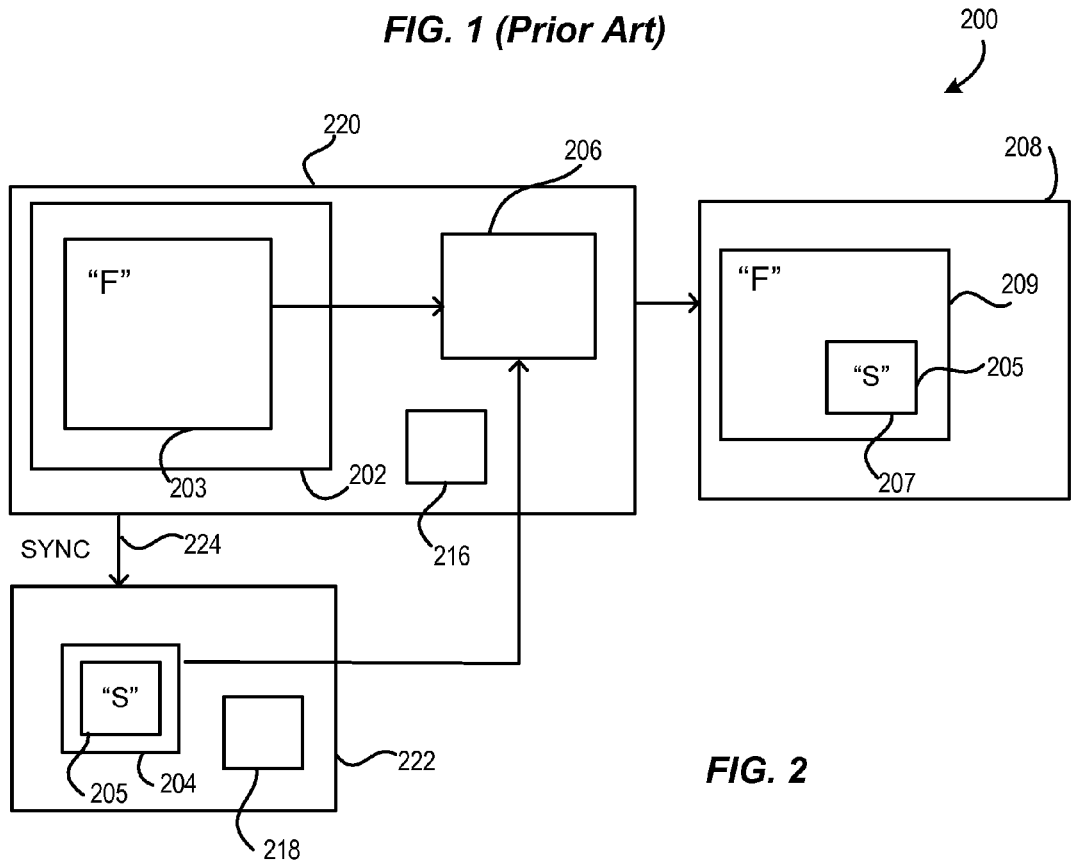
FIG. 2 includes a schematic functional block diagram of a system and method for forming a picture-in-picture (PIP) image, according to some exemplary embodiments.

FIG. 2 includes a schematic functional block diagram of a system 200 and method for forming a picture-in-picture (PIP) image, according to some exemplary embodiments. Referring to FIG. 2, according to some exemplary embodiments, system 200 includes a first video image sensor 202 for generating a first video image "F" 203 of a first scene and a second video image sensor 204 for generating a second video image "s" 205 of a second scene. In general, second video image sensor 204 generates a smaller video image "s" 205 having lower resolution, compared to first video image "F" 203 of first video image sensor 202. In the final composite PIP video image 209, second video image "s" 205 is combined with and located within first video image "F" 203.

In some exemplary embodiments, an optional and/or adjustable PIP boundary 207 is included surrounding second video image "s" 205 within composite PIP video image 209. PIP boundary 207 can be any desired thickness and color. It may also be omitted completely. PIP boundary 207 includes a top horizontal line, a bottom horizontal line, and left and right vertical lines. These PIP boundary lines are defined by relevant image data in composite PIP video image 209, as described below in further detail.

System 200 of FIG. 2 also includes overlay logic 206, which contains the processing and logic circuitry used to combine first video image "F" 203 of first video image sensor 202 with second video image "s" 205 of second video image sensor 204 to generate the video image data required for composite PIP video image 209. Overlay logic 206 outputs the PIP video image data stream for composite PIP video image 209 to a device 208 such as a display for display of composite PIP video image 209 and/or a memory for storage of composite PIP video image 209. Composite PIP video image 209 is a combination of first image "F" 203 and second video image "s" 205.

Referring to FIG. 2, overlay logic 206 receives the first video image data stream for first image "F" 203 directly from first video image sensor 202 and also receives the second video image data stream for second video image "s" 205 directly from second video image sensor 204. That is, in the exemplary embodiments illustrated in FIG. 2, frame memory 110 used in conventional systems 100 described above and illustrated in FIG. 1 is not used. In system 200 illustrated in FIG. 2, a frame memory is not necessary because in the exemplary embodiments, first and second video image sensors 202 and 204 and their respective first and second video image data streams are synchronized. As a result, the video image data for second video image "s" 205 need not be temporarily stored in a frame memory to ensure that none of the video image data for second video image "s" 205 is lost while overlay logic 206 performs the processing required to combine first and second video images "F" 203 and "s" 205. Instead, overlay logic 206 receives both video image data streams directly from their respective video image sensors 202, 204 and processes them to produce the composite PIP video image data stream, without the need for an intervening frame memory.

As illustrated in FIG. 2, in some exemplary embodiments, first video image sensor 202 can be integrally formed with overlay logic 206, since in the exemplary embodiments, no frame memory is included. That is, referring to FIG. 2, first video image sensor 202 and overlay logic 206 can be formed as part of the same video image sensor device 220. First video image sensor device 220 can be a substrate or chip die or other single device configuration. First video image sensor device 220 can also include additional processing or support circuitry 216 as required to carry out the operation of first video image sensor device 220. Additional processing or support circuitry 216 can also be integrated in the same substrate or chip die or other single device configuration as first video image sensor 202 and overlay logic 206. As further illustrated in FIG. 2, second video image sensor 204 can be fabricated as part of another individual second video image sensor device 222 separate from first video image sensor device 220. Second video image sensor device 222 can also include additional processing or support circuitry 218 as required to carry out the operation of second video image sensor device 222. Additional processing or support circuitry 218 can be integrated in the same substrate or chip die or other single device configuration as second video image sensor 202. First and second video image sensor devices 220 and 222 together can form a kit or set of PIP video image sensors, which can be provided together as a set.

As described above, according to some exemplary embodiments, the first video image data stream generated by first video image sensor device 220 and the second video image data stream generated by second video image sensor device 222 are synchronized. To that end, as illustrated in FIG. 2, in some exemplary embodiments, first video image sensor device 220 generates a synchronization signal SYNC and transmits the signal SYNC on signal line or bus 224 to second video image sensor device 222 to synchronize the two video image sensor devices 220 and 222 and the first and second video image data streams, respectively.

In some exemplary embodiments, synchronization signal SYNC is generated as a single pulse signal. It is received by second video image sensor device 222 and used by second video image sensor device 222 to trigger the commencement of the transmission of the second video image data stream for second video image "s" 205 to overlay logic 206 in first video image sensor device 220. The timing of the transmission of the second video image data stream for second video image "s" 205 determines the location of second video image "s" 205 in first video image "F" 203 and, therefore, within composite PIP video image 209. Hence, the timing of the synchronization signal SYNC is selected to locate second video image "s" 205 within composite PIP video image 209.

FIGS. 3A and 3B include schematic timing diagrams illustrating the timing of the first and second video image data streams being transmitted to overlay logic 206 and the synchronization signal SYNC being transmitted from first video image sensor device 220 to second video image sensor device 222, according to some exemplary embodiments. FIGS. 3A and 3B illustrate two examples of the relationship between the timing of the synchronization signal SYNC and the relative timing of the two video image data streams and, therefore, the location of second video image "s" 205 within first video image "F" 203 in the composite PIP video image 209.

Referring to FIG. 3A, the scenario in which the synchronization signal SYNC is issued at the beginning of the first video image stream is illustrated. In this particular exemplary illustration, the second video image data stream is initiated a very short time after the synchronization signal SYNC is issued, such that both the first and second video image data streams begin at or near the beginning of a frame. As a result, second video image "s" 205 will be located at or near the top of first video image "F" 203 in composite PIP video image 209.

Referring to FIG. 3B, the scenario in which the synchronization signal SYNC is issued at or near the middle of the first video image data stream is illustrated. In this particular exemplary illustration, the second video image data stream is initiated a very short time after the synchronization signal SYNC is issued, such that the second video image data stream begins at or near the middle of a frame, i.e., the first video image data stream. As a result, second video image "s" 205 will be located at or near the middle of first video image "F" 203 in composite PIP video image 209.

It will be understood that FIGS. 3A and 3B illustrate exemplary scenarios only. For example, the timing of the synchronization signal SYNC can be adjusted as desired to time the initiation of the second video image data stream to any time such that second video image "s" 205 can be located anywhere within first video image "F" 203 in composite PIP video image 209. Also, it will be understood that the second video image data stream can be initiated any time after the synchronization signal SYNC is issued by first video image sensor device 220 and received by second video image sensor device 222. The exemplary embodiments illustrated in FIGS. 3A and 3B show the second video image data stream being commenced almost immediately after the synchronization signal SYNC is issued. This need not always be the case, i.e., according to some exemplary embodiments, that time delay can be set to any desired delay and can be adjusted as desired.

Figure 4:
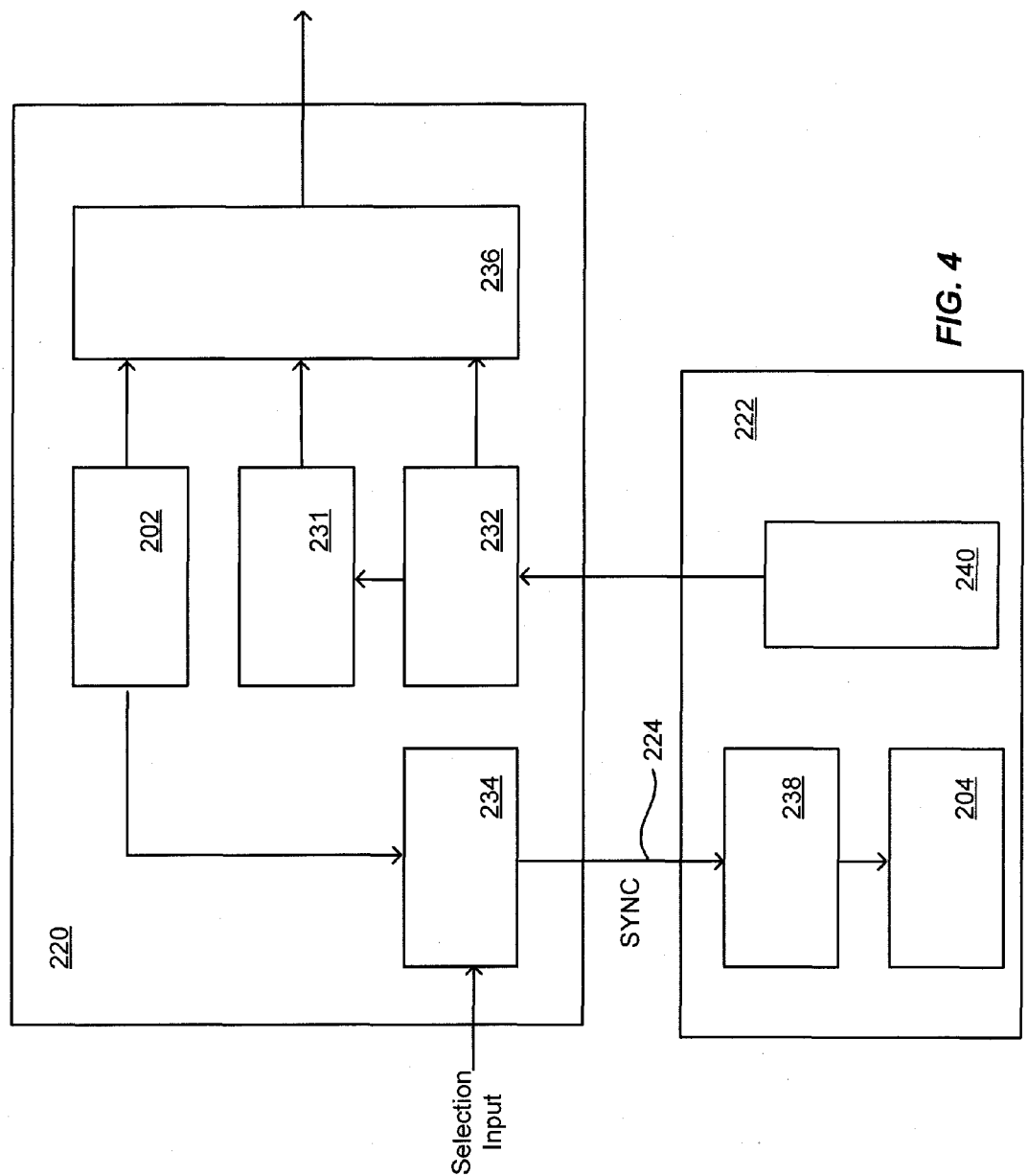
FIG. 4 includes a schematic detailed block diagram of at least portions of first and second video image sensor devices, according to some exemplary embodiments.

FIG. 4 includes a schematic detailed block diagram of at least portions of first and second video image sensor devices 220 and 222, according to some exemplary embodiments. Referring to FIG. 4, first video image sensor device 220 includes first video image sensor 202 for generating first video image "F" 203. As described above, first video image sensor device 220 can also include additional processing or support circuitry 216 as required to carry out the operation of first video image sensor device 220. This additional processing or support circuitry 216 can include PIP image boundary generator circuit 231, which generates image data for optional PIP boundary 207 surrounding second video image "s" 205 in composite PIP video image 209. Additional processing or support circuitry 216 can also include data receiver/data buffer circuitry 232, which can be a serial data receiver/data buffer circuit, which receives and can temporarily store data of the second video image data stream for second video image "s" 205 received from second video image sensor device 222. Additional processing or support circuitry 216 can also include timing control circuitry 234. Timing control circuitry 234 includes the processing and timing circuitry required to generate the synchronization signal SYNC and to transmit the signal SYNC to second video image sensor device 222 to trigger initiation of the second video image data stream for second video image "s" 205 from second video image sensor 204. Timing control circuitry 234 times the synchronization signal SYNC with respect to the data of first video image sensor 202. To that end, timing control circuitry 234 receives a timing signal from first video image sensor 202.

Timing control circuitry 234 can receive a selection input, which can be provided, for example, by a user, or can be preprogrammed. The selection input defines a desired location of second video image "s" 205 within first video image "F" 203 of composite PIP video image 209. Based on the desired location input at the selection input, timing control circuitry 234 generates the synchronization signal SYNC with respect to the first video image data stream from first video image sensor 202 and transmits the signal SYNC on line or bus 224 to timing control circuitry 238 in second video image sensor 222 to initiate the second video image data stream for second video image "s" 205 from second video image sensor 204 in second video image sensor device 222 such that, when first video image "F" 203 and second video image "s" 205 are combined, second video image "s" 205 appears in the selected desired location within first video image "F" 203 in composite PIP video image 209.

Second video image sensor device 222 includes video image sensor 204, which generates and outputs the second video image data stream for second video image "s" 205 to a data transmission circuit 240, which can be, for example, a serial data transmitter, which transmits the second video image data stream to first video image sensor device 220 via a serial data port. The transmission of the second video image data stream from second video image sensor 204 to data transmission circuitry 240 is triggered by timing control circuitry 238, which commands second video image sensor 204 to initiate transmission of the second video image data stream via a control signal in response to the synchronization signal SYNC received from first video image sensor device 220.

As described above, data receiver/data buffer circuitry 232 in first video image sensor device 220 receives the second video image data stream from data transmission circuitry 240 in second video image sensor device 222. The second video image data stream is transmitted by data receiver/data buffer circuitry 232 to PIP image combination logic 236, which can be considered at least part of overlay logic 206 described above in detail. PIP image combination logic 236 also receives the first video image data stream from first video image sensor 202 and PIP image boundary data from PIP image boundary generator circuit 231. PIP image boundary generator circuit 231 also receives information regarding second video image "s" 205 from data receiver/data buffer circuitry 232 such that data for PIP boundary 207 generated by PIP boundary generator circuit 231 includes the appropriate location information such that PIP boundary 207 is properly located to surround second video image "s" 205. PIP image combination logic 236 combines data of first video image "F" 203 in the first video image data stream, data of second video image "s" 205 in the second video image data stream and PIP image boundary data from PIP image boundary generator circuit 231 to generate data for composite PIP video image 209. The video image data stream for composite PIP video image 209 is output from first video image sensor device 220 to device 208 for display and/or storage of composite PIP video image 209.

Figure 5:
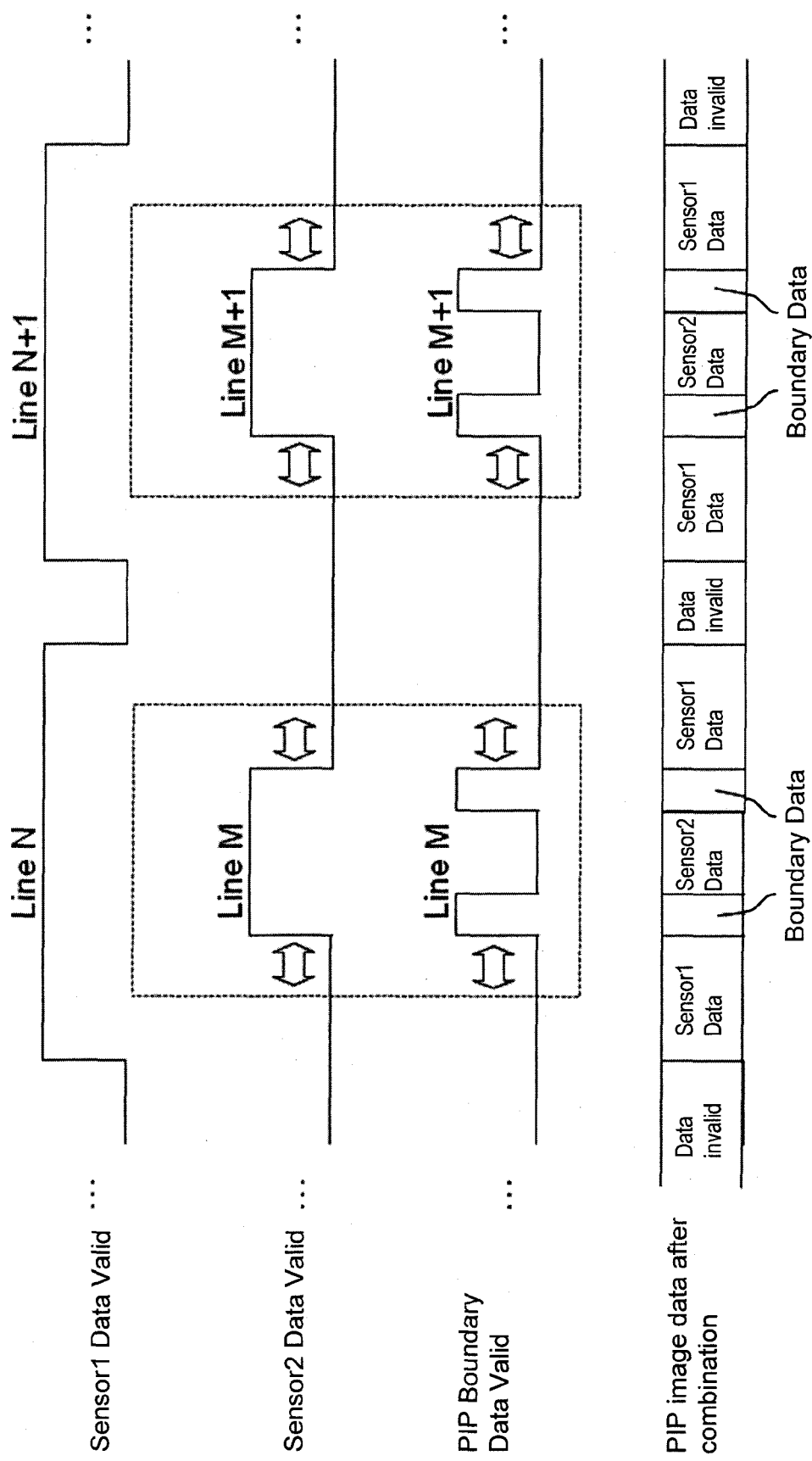
FIG. 5 includes schematic timing diagrams which illustrate generation of a composite PIP video image from a first video image, second video image, and PIP boundary image data, according to some exemplary embodiments.

FIG. 5 includes schematic timing diagrams which illustrate generation of composite PIP video image 209 from first video image "F" 203, second video image "s" 205 and PIP boundary image data, according to some exemplary embodiments. Referring to FIG. 5, the top timing diagram illustrates data valid time periods for the first video image data stream for two typical lines N and N+1 in first video image "F" 203 from first video image sensor 202 ("Sensor1"). The second timing diagram illustrates data valid time periods for the second video image data stream for two typical lines M and M+1 in second video image "s" 205 from second video image sensor 204 ("Sensor2"). The third timing diagram illustrates data valid time periods for optional boundary 207 for the two typical lines M and M+1 in second video image "s" 205. It should be noted that the timing diagram for boundary data for lines M and M+1 illustrates lines in which the portion of boundary 207 being used are the left and right vertical lines of boundary 207. In the case of the top and bottom horizontal lines of boundary 207, the data valid periods of the boundary data would be substantially the same as those of the second timing diagram of FIG. 5 for the Sensor2 data valid time periods for lines M and M+1.

The fourth diagram of FIG. 5 illustrates the timing of composite PIP video image data stream after the combination of the first and second video image data streams and the boundary data is complete. Referring to the fourth timing diagram in FIG. 5, the combined PIP video image data includes a Data Invalid time period, which occurs between lines of first video image "F" 203. Next, the timing includes a Sensor1 Data period, which coincides with the portion of a line in composite PIP video image 209 that is to the left of second video image "s" 205. Next, the timing includes a first Boundary Data period, which coincides with the left vertical line of PIP boundary 207. Next, the timing includes a Sensor2 Data period, which coincides with a line of second video image "s" 205 within the current line of composite PIP video image 209. Next, the timing includes a second Boundary Data period, which coincides with the right vertical line of PIP boundary 207. Next, the timing includes another Sensor1 Data period, which coincides with the portion of the current line in composite PIP video image 209 that is to the right of second video image "s" 205. At the end of the second Sensor1 Data period, the end of the current line is indicated by another Data Invalid time period. The next line, i.e., line N+1, begins with the first Sensor1 Data time period of the next line. This timing is repeated for each line of composite PIP video image 209 that includes a line of second video image "s" 205.

As described above, the timing diagrams of FIG. 5 assume a general line of composite PIP video image 209, which includes left and right vertical lines of PIP boundary 207. As noted above, PIP boundary 207 is optional and need not be included in composite PIP video image 209. If PIP boundary 207 is omitted, then the PIP Boundary Data time periods of the third timing diagram of FIG. 5 would not be present. As a result, the fourth timing diagram of FIG. 5 would include only Data Invalid time periods, Sensor1 Data time periods and Sensor2 Data time periods.

It should be noted that the timing diagrams of FIG. 5 are illustrative examples used in providing a clear description. The timing of the various Data Valid and Data Invalid periods depend on the two-dimensional position of second video image "s" 205 within first video image "F" 203 of composite PIP video image 209. As illustrated in the exemplary illustrations of FIG. 5, second video image "s" 205 is horizontally centered within first video image "F" 203. As noted above, this positioning can be controlled by controlling the timing of the synchronization signal SYNC. The vertical positioning of second video image "s" 205 within first video image "F" 203 of composite PIP video image 209 is not illustrated in FIG. 5, but, as described above, it can also be controlled by controlling the timing of synchronization signal SYNC.

Combinations of Features

Various features of the present disclosure have been described above in detail. The disclosure covers any and all combinations of any number of the features described herein, unless the description specifically excludes a combination of features. The following examples illustrate some of the combinations of features contemplated and disclosed herein in accordance with this disclosure.

In any of the embodiments described in detail and/or claimed herein, the first image sensor device and the overlay logic are formed in a first substrate.

In any of the embodiments described in detail and/or claimed herein, the second image sensor device is formed in a second substrate.

In any of the embodiments described in detail and/or claimed herein, the first signal comprises a first video image data stream, and the second signal comprises a second video image data stream.

In any of the embodiments described in detail and/or claimed herein, the first image sensor device generates a synchronization signal, the second video image data stream being triggered in response to the synchronization signal.

In any of the embodiments described in detail and/or claimed herein, the synchronization signal triggers the second video image data stream to begin at a selected position of the first video image data stream.

In any of the embodiments described in detail and/or claimed herein, the first and second video image data streams have first and second frame rates, respectively.

In any of the embodiments described in detail and/or claimed herein, the first and second frame rates are substantially equal.

While the present disclosure makes reference to exemplary embodiments, it will be understood by those of ordinary skill in the art that various changes in form and details may be made therein without departing from the spirit and scope of the present disclosure.

I claim:

1. A picture-in-picture (PIP) system, comprising:
   a first image sensor device for detecting light from a first subject and generating a first signal indicative of a first image of the first subject;
   a second image sensor device for detecting light from a second subject and generating a second signal indicative of a second image of the second subject;
   the first signal comprises a first video image data stream, and the second signal comprises a second video image data stream;
   the first image sensor device generates a synchronization signal different from the first signal, the second video image data stream being triggered in response to the synchronization signal;
   and overlay logic for combining the first and second signals to generate a picture-in-picture signal indicative of a combination of the first image of the first subject and the second image of the second subject, wherein the overlay logic is located within the first image sensor device.

2. The PIP system of claim 1, wherein the first image sensor device and the overlay logic are formed in a first substrate.

3. The PIP system of claim 2, wherein the second image sensor device is formed in a second substrate.

4. The PIP system of claim 1, wherein the synchronization signal triggers
the second video image data stream to begin at a selected position of the first video image data stream.

5. The PIP system of claim 1, wherein the first and second video image
data streams have first and second frame rates, respectively.

6. The PIP system of claim 5, wherein the first and second frame rates are equal.

7. A picture-in-picture (PIP) method, comprising:
detecting light from a first subject and generating a first signal indicative of an image of the first subject, with a first image sensor device;
detecting light from a second subject and generating a second signal indicative of a second image of the second subject, with a second image sensor device;
the first signal comprises a first video image data stream, and the second signal comprises a second video image data stream;
triggering the second video image data stream in response to a synchronization signal generated by the first image sensor device, the synchronization signal being different from the first signal;
and combining the first and second signals to generate a picture-in-picture signal indicative of a combination of the first image of the first subject and the second image of the second subject, said combining being performed by the first image sensor device.

8. The PIP method of claim 7, wherein the synchronization signal triggers the second video image data stream to begin at a selected position of the first video image data stream.

9. The PIP method of claim 7, wherein the first and second video image data streams have first and second frame rates, respectively.

10. The PIP method of claim 9, wherein the first and second frame rates are equal.

* * * * *